United States Patent
Ogasawara et al.

(10) Patent No.: US 9,570,740 B2
(45) Date of Patent: Feb. 14, 2017

(54) NONAQUEOUS ELECTROLYTE SECONDARY BATTERY AND METHOD FOR MANUFACTURING NONAQUEOUS ELECTROLYTE SECONDARY BATTERY

(75) Inventors: Takeshi Ogasawara, Kobe (JP); Hiroyuki Matsumoto, Kobe (JP); Naoki Imachi, Kobe (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 476 days.

(21) Appl. No.: 12/872,125

(22) Filed: Aug. 31, 2010

(65) Prior Publication Data

US 2011/0059356 A1    Mar. 10, 2011

(30) Foreign Application Priority Data

Sep. 4, 2009  (JP) .................. 2009-204274
Dec. 18, 2009 (JP) .................. 2009-287286

(51) Int. Cl.
*H01M 4/131* (2010.01)
*H01M 4/505* (2010.01)
(Continued)

(52) U.S. Cl.
CPC .......... *H01M 4/505* (2013.01); *H01M 4/366* (2013.01); *H01M 4/525* (2013.01); *H01M 10/0525* (2013.01); *H01M 10/0567* (2013.01); *H01M 10/4235* (2013.01); *H01M 2004/021* (2013.01); *Y02E 60/122* (2013.01); *Y02P 70/54* (2015.11); *Y10T 29/49115* (2015.01)

(58) Field of Classification Search
CPC ...... H01M 4/505; H01M 4/366; H01M 4/525; H01M 10/0525; H01M 10/0567; H01M 10/4235

See application file for complete search history.

(56) References Cited

U.S. PATENT DOCUMENTS 6,797,435 B2    9/2004 Kweon et al.
7,811,478 B2 *  10/2010 Yoshida et al. .......... 252/519.15
(Continued)

FOREIGN PATENT DOCUMENTS

CN    1816928 A    8/2006
CN    101401233 A  4/2009
(Continued)

OTHER PUBLICATIONS

Office Action dated May 21, 2014, issued in corresponding Chinese Patent Application No. 201010264996.9, with English Translation (13 pages).
(Continued)

*Primary Examiner* — Helen O Conley
(74) *Attorney, Agent, or Firm* — Westerman, Hattori, Daniels & Adrian, LLP

(57) ABSTRACT

In a nonaqueous electrolyte secondary battery including a positive electrode, a negative electrode and a nonaqueous electrolytic solution, the nonaqueous electrolytic solution contains a nitrile compound having a chain saturated hydrocarbon group and a nitrile group, the number of carbon atoms in the nitrile compound is four or more, and the positive electrode contains a positive-electrode active material on the surface of which particles of a rare earth element compound are deposited in dispersed form.

12 Claims, 7 Drawing Sheets

(51) Int. Cl.
*H01M 4/36* (2006.01)
*H01M 4/525* (2010.01)
*H01M 10/0525* (2010.01)
*H01M 10/0567* (2010.01)
*H01M 10/42* (2006.01)
*H01M 4/02* (2006.01)

(56) References Cited

U.S. PATENT DOCUMENTS

| | | | |
|---|---|---|---|
| 2002/0142224 A1 | 10/2002 | Kweon et al. | |
| 2003/0077517 A1* | 4/2003 | Nakanishi et al. | 429/324 |
| 2006/0177739 A1 | 8/2006 | Endo et al. | |
| 2008/0102369 A1 | 5/2008 | Sakata et al. | |
| 2008/0318131 A1* | 12/2008 | Watanabe | C01G 51/42 |
| | | | 429/231.95 |
| 2009/0123851 A1* | 5/2009 | Soma et al. | 429/342 |
| 2012/0231330 A1 | 9/2012 | Fujii et al. | |

FOREIGN PATENT DOCUMENTS

| | | | | |
|---|---|---|---|---|
| JP | 06-150928 | * | 5/1994 | H01M 4/58 |
| JP | 2002-279991 A | | 9/2002 | |
| JP | 2005-216651 | * | 1/2004 | H01M 4/58 |
| JP | 2005-196992 A | | 7/2005 | |
| JP | 2007-538365 A | | 12/2007 | |
| JP | 2008-108586 A | | 5/2008 | |
| JP | 2008-226495 A | | 9/2008 | |
| JP | 2009-158464 A | | 7/2009 | |
| WO | 2005/117198 A1 | | 12/2005 | |

OTHER PUBLICATIONS

Chinese Office Action dated Nov. 25, 2013, issued in corresponding Chinese Patent Application No. 201010264996.9 with partial English translation (10 pages).

Japanese Office Action dated Jul. 30, 2013, issued in corresponding Japanese Patent Application No. 2009-287286 (4 pages).

Carlier D., "Lithium Electrochemical Deintercalation from O2-LiCoO2 Structure and Physcial Properties", Journal of the Electrochemical Society, 149 (1) A1310-A1320 (2002).

Adachi, Gin-ya, "Science of Rare Earths", p. 304, Table 14.12, published on Mar. 30, 1999 by Kagaku-Dojin Publishing Company, Inc, (pages cover p. 304, 305 and 896).

* cited by examiner

NONAQUEOUS ELECTROLYTE SECONDARY BATTERY AND METHOD FOR MANUFACTURING NONAQUEOUS ELECTROLYTE SECONDARY BATTERY

BACKGROUND OF THE INVENTION

Field of the Invention

This invention relates to a nonaqueous electrolyte secondary battery and a method for manufacturing a nonaqueous electrolyte secondary battery, and particularly relates to a nonaqueous electrolyte secondary battery improved in characteristics after continuous charging and a method for manufacturing such a nonaqueous electrolyte secondary battery.

Description of Related Arts

In recent years, size and weight reduction of mobile information terminals, such as cellular phones, notebook computers and PDAs, has rapidly progressed. Batteries used as their driving power sources are being required to achieve a higher capacity. To meet such a request, nonaqueous electrolyte secondary batteries using a nonaqueous electrolytic solution to perform charge and discharge by moving lithium ions between positive and negative electrodes are widely utilized as new secondary batteries having high output and high energy density.

In these nonaqueous electrolyte secondary batteries, materials commonly used as positive-electrode active materials include lithium cobalt oxide ($LiCoO_2$), spinel lithium manganate ($LiMn_2O_4$), cobalt-nickel-manganese-containing lithium composite oxides, and aluminum-nickel-cobalt-containing lithium composite oxides. On the other hand, materials used as negative-electrode active materials include carbon materials, such as graphite, and materials capable of forming an alloy with lithium, such as Si and Sn.

However, in more recent years, mobile information terminals have enhanced their entertainment features including a video playing feature and a gaming feature and have thereby tended to further increase the power consumption. Therefore, nonaqueous electrolyte secondary batteries are being required to achieve a still higher capacity.

Possible measures for increasing the capacity of a nonaqueous electrolyte secondary battery include (1) increasing the capacity of the active material, (2) increasing the charge voltage, and (3) increasing the amount of active material packed, i.e., increasing the packing density.

Particularly if the charge voltage is increased, there arises a problem of ease of decomposition of the electrolytic solution. More particularly, if the battery is stored or continuously charged at high temperatures, the electrolytic solution may decompose to produce gas, thereby causing problems of swelling of the battery and increased internal pressure of the battery.

Published Japanese Patent Application No. 2007-538365 proposes a lithium secondary battery using a nitrile group-containing compound for an electrolytic solution, wherein the positive-electrode active material used is a lithium-containing composite oxide which contains one or more elements selected from the group consisting of alkali metals, alkaline earth metals, 13th group elements, 14th group elements, 15th group elements, transition metals and rare earth elements and is doped with a heterogeneous metal selected from Al, Mg, Zr, Fe, Zn, Ga, Sn, Si and Ge. The document describes that thus the nitrile groups bind to the surface of the positive electrode at high temperatures to form a complex, and the complex serves as a protective film for blocking active sites on the surface of the positive electrode. The document also describes that the protective film inhibits part of a transition metal from being eluted from the positive-electrode active material and deposited on the negative electrode and inhibits the occurrence of a side reaction and gas generation due to reactions between the electrolytic solution and the positive electrode, whereby lithium can be smoothly storaged and released even at high temperatures to thereby inhibit the deterioration in lifetime characteristic.

Published Japanese Patent Application No. 2008-108586 proposes that an oxide of a lithium-containing transition metal containing at least one metal element selected from Mg, Ti, Zr, Ge, Nb, Al and Sn is used as a positive-electrode active material, and a compound having two or more nitrile groups in the molecule is contained in the electrolytic solution. The document describes that the nitrile compound has the function of forming a coating on the surface of the positive-electrode active material, and the formation of such a surface protective coating prevents direct contact of the electrolytic solution with the positive-electrode active material to inhibit gas generation, whereby the crystal structure of the positive-electrode active material can be stabilized to increase the storage performance and safety of the battery.

Published Japanese Patent Application No. 2002-279991 proposes to use a positive-electrode active material in which two or more compound layers each made of a hydroxide, an oxyhydroxide, an oxycarbonate or a hydroxycarbonate of Mg, Al, Co, K, Na, Ca, Si, Ti, V, Sn, Ge, Ga, B, As or Zr are formed on the core of the positive-electrode active material. The document describes that thus the cycle characteristics are improved.

These conventional techniques, however, do not describe any approach for reducing the drop in discharge voltage after storage at high temperatures or after continuous charging at high temperatures.

Meanwhile, Published Japanese Patent Application No. 2008-226495 describes a means for impregnating particulate powder of a lithium-containing composite oxide (positive-electrode active material) with a solution (impregnating solution) containing a lanthanum source by spraying. The document also describes that the amount of impregnating solution is preferably controlled within the range from 0.1% to 80% by weight relative to the weight of a matrix used, more preferably within the range from 1% to 75% by weight, and particularly preferably within the range from 1% to 40% by weight. In other words, the method described in Published Japanese Patent Application No. 2008-226495 shows that the amount of impregnating solution may be within the range from 40% to 80% by weight. Therefore, according to this method, the impregnating solution can be sprayed to such an extent that the positive-electrode active material is soaked therein.

SUMMARY OF THE INVENTION

An object of the present invention is to provide a nonaqueous electrolyte secondary battery that can not only inhibit gas generation during continuous charging but also significantly reduce the deterioration in discharge characteristic after continuous charging.

An aspect of the present invention is directed to a nonaqueous electrolyte secondary battery including a positive electrode, a negative electrode and a nonaqueous electrolytic solution, wherein the nonaqueous electrolytic solution contains a nitrile compound having a chain saturated hydrocarbon group and a nitrile group, the number of carbon atoms in the nitrile compound is four or more, and the positive electrode contains a positive-electrode active material on the surface of which particles of a rare earth element compound are deposited in dispersed form.

In this aspect of the present invention, a positive-electrode active material on the surface of which particles of a rare earth element compound are deposited in dispersed form is used, and a nonaqueous electrolytic solution containing the above nitrile compound is used. Therefore, not only gas generation during continuous charging can be inhibited, but also the deterioration in discharge characteristic after continuous charging can be significantly reduced.

Since in this aspect of the present invention the above nitrile compound is contained in the nonaqueous electrolytic solution, a coating of the nitrile compound is formed on the surface of the positive-electrode active material during initial charging, and the coating can inhibit the decomposition reaction of the nonaqueous electrolytic solution.

Furthermore, in this aspect of the present invention, particles of a rare earth element compound are deposited in dispersed form on the surface of the positive-electrode active material. By using such a positive-electrode active material, the nonaqueous electrolytic solution can be inhibited from further decomposing as in gaps in the coating formed by the decomposition of the nitrile compound.

Therefore, not only gas generation during continuous charging can be inhibited, but also the deterioration in discharge characteristic after continuous charging can be significantly reduced.

The number of carbon atoms in the nitrile compound used in this aspect of the present invention is four or more. If the number of carbon atoms is less than four, the nitrile compound becomes very likely to decompose. In this case, even with the use of a positive-electrode active material on the surface of which particles of a rare earth element compound are deposited, the deterioration in discharge characteristic after continuous charging cannot be sufficiently inhibited.

The upper limit of the number of carbons in the chain saturated hydrocarbon group in the nitrile compound used in this aspect of the present invention is preferably 12 or less. The reason for this is that if the nitrile compound has an excessively large number of carbons, it will have a small number of nitrile groups even if having the same mass as other nitrile compounds.

In this aspect of the present invention, the average particle diameter of particles of the rare earth element compound is preferably 100 nm or less, and more preferably 50 nm or less. Furthermore, the lower limit of the average particle diameter is preferably 1 nm or more, and more preferably 10 nm or more.

One reason for the above is that if the average particle diameter of particles of the rare earth element compound is 100 nm or less, the particles can be deposited in uniformly dispersed form on the surface of the positive-electrode active material. Another reason for the above is that it has been found from the below-described results of Examples that if the average particle diameter of the particles is 50 nm or less, the decomposition reaction of the electrolytic solution can be effectively inhibited.

On the other hand, if the average particle diameter of particles of the rare earth element compound is less than 1 nm, it can be assumed that the surface of the positive-electrode active material is excessively coated with the particles, whereby the discharge performance is lowered. Furthermore, if the average particle diameter is not less than 10 nm, this ensures a sufficient area of the positive-electrode active material surface deposited with the particles.

The nitrile compound used in this aspect of the present invention preferably has two or more nitrile groups.

Examples of the nitrile compound having two nitrile groups include at least one selected from glutaronitrile, adiponitrile and pimelonitrile. Examples of the nitrile compound having three nitrile groups include at least one selected from 1,2,3-propanetricarbonitrile and 1,3,5-pentanetricarbonitrile.

Nitrile compounds having three or less nitrile groups are generally commercially available and therefore easily obtainable.

In this aspect of the present invention, the amount of the nitrile compound contained in the nonaqueous electrolytic solution is not particularly limited, but is preferably within the range from 0.1% to 10% by mass and more preferably within the range from 0.1% to 5% by mass. If the amount of the nitrile compound in the nonaqueous electrolytic solution is less than 0.1% by mass, a coating of the nitrile compound cannot be sufficiently formed during initial charging and discharging, whereby it may not sufficiently inhibit the decomposition of the nonaqueous electrolytic solution. On the other hand, if the amount of the nitrile compound is above 10% by mass, the viscosity of the nonaqueous electrolytic solution becomes high, which may present a problem in that the permeability of the nonaqueous electrolytic solution is lowered. In addition, if the amount of the nitrile compound is above 5% by mass, the coating of the nitrile compound increases in thickness in proportion to the content of the nitrile compound, which may lower the discharge performance.

Another aspect of the present invention is directed to a method for manufacturing a nonaqueous electrolyte secondary battery, and the method includes the steps of: preparing a suspension containing a positive-electrode active material dispersed therein; preparing a solution in which a rare earth salt is dissolved; adding the solution to the suspension; filtering the resultant solution after the addition to obtain the positive-electrode active material on the surface of which a hydroxide of the rare earth element is deposited; producing a positive electrode using the positive-electrode active material on the surface of which the hydroxide of the rare earth element is deposited; producing an electrode assembly using the positive electrode, a negative electrode and a separator; and impregnating the electrode assembly with a nonaqueous electrolytic solution.

When the suspension containing a positive-electrode active material dispersed therein is stirred and a rare earth salt is introduced into the suspension being stirred, the rare earth salt is made into particles of a hydroxide. Furthermore, since the suspension still continues to be stirred, the hydroxide particles collide with the positive-electrode active material and are thereby deposited in uniformly dispersed form on the surface of the positive-electrode active material. Thus, particles of the rare earth element compound can be deposited in uniformly dispersed form on the surface of the positive-electrode active material.

Note that in this case, an alkaline aqueous solution, such as sodium hydroxide or potassium hydroxide, is added to the suspension to maintain the pH of the suspension at 6 to 13. Thus, the particles of the rare earth element hydroxide can be precipitated.

Still another aspect of the present invention is directed to a method for manufacturing a nonaqueous electrolyte secondary battery, and the method includes the steps of: preparing a solution in which a rare earth salt is dissolved in an aqueous solvent; depositing a hydroxide of the rare earth element on the surface of a positive-electrode active material by spraying the solution on the positive-electrode active material being stirred to moisten the surface of the positive-electrode active material with the solution; producing a positive electrode using the positive-electrode active material on the surface of which the hydroxide of the rare earth element is deposited; producing an electrode assembly using the positive electrode, a negative electrode and a separator; and impregnating the electrode assembly with a nonaqueous electrolytic solution.

While the positive-electrode active material is stirred, a solution containing a rare earth salt dissolved therein is sprayed on the positive-electrode active material. Thus, particles of the rare earth element hydroxide can be deposited uniformly on the surface of the positive-electrode active material. According to this method, the step of separating the positive-electrode active material from the solution can be eliminated.

It is only necessary that the amount of the solution sprayed be such as to moisten the surface of the positive-electrode active material. If the amount of the solution is excessive, the step of separating the positive-electrode active material from the solution will be needed. The optimal value of the amount of the solution sprayed depends on the particle diameter and specific surface area of the positive-electrode active material. However, if the mass of the solution sprayed is 10% to 20%, both inclusive, of the mass of the positive-electrode active material, the hydroxide of the rare earth element can be deposited uniformly on the surface of the positive-electrode active material.

Examples of means that can be used to stir the positive-electrode active material include drum mixers, Loedige mixers and twin screw kneaders.

In either manufacturing method described above, a water-soluble rare earth salt, such as a nitrate salt, a sulfate salt, a chloride salt or an acetate salt of the rare earth element, can be used as the rare earth salt.

In either manufacturing method, after the deposition of the rare earth element hydroxide, the positive-electrode active material is dried and subjected to a heat treatment. The temperature of the heat treatment is generally preferably within the range from 80° C. to 600° C., and particularly preferably within the range from 80° C. to 400° C. If the heat treatment temperature is above 600° C., some of fine particles of the rare earth compound deposited on the surface of the positive-electrode active material are diffused into the active material. This lowers the initial charge/discharge efficiency. Therefore, in order to obtain a high-capacity active material having a rare earth compound deposited more selectively on the surface thereof, the heat treatment temperature is preferably 600° C. or below. The hydroxide deposited on the surface of the positive-electrode active material is made into the form of a hydroxide, an oxyhydroxide, an oxide, etc. depending on the subsequent heat treatment. Therefore, the rare earth element compound deposited on the surface of the positive-electrode active material according to the above methods of the present invention takes the final form of a hydroxide, an oxyhydroxide, an oxide or others. If in this case the heat treatment is performed at 400° C. or below, the rare earth element compound mainly takes the form of a hydroxide or an oxyhydroxide. The heat treatment time is generally preferably for three to seven hours.

In the present invention, the amount of rare earth element compound deposited on the positive-electrode active material is preferably within the range from 0.005% to 0.5% by mass, and more preferably within the range from 0.01% to 0.3% by mass. If the amount of rare earth element compound deposited is small, improvement in discharge characteristic after continuous charging may not be sufficiently achieved.

If the amount of rare earth element compound deposited is too large, the surface of the positive-electrode active material is excessively coated with particles of the rare earth compound not contributing to charge and discharge reactions, which may lower the discharge performance.

Note that the amount of rare earth element compound deposited is the amount thereof deposited relative to the positive-electrode active material. For example, if the amount of rare earth element compound deposited is 0.1% by mass, 0.1 parts by mass of rare earth element compound is deposited on the positive-electrode active material relative to 100 parts by mass of positive-electrode active material in a state where no rare earth element compound is deposited. Furthermore, the amount of rare earth element compound deposited is expressed in terms of the amount of rare earth element.

The rare earth element of the rare earth element compound in the present invention is not particularly limited so long as it is a rare earth element, but examples thereof include erbium, samarium, neodymium, ytterbium, terbium, dysprosium, holmium, thulium and lutetium.

Examples of the positive-electrode active material in the present invention include lithium-containing transition metal composite oxides containing a transition metal, such as cobalt, nickel or manganese. Specific examples of the positive-electrode active material include lithium cobalt oxide, Ni—Co—Mn-containing lithium composite oxides, Ni—Mn—Al-containing lithium composite oxides and Ni—Co—Al-containing lithium composite oxides. These positive-electrode active materials may be used singly or in mixture.

The negative-electrode active material used in the present invention is not particularly limited so long as it can be used as a negative-electrode active material for a nonaqueous electrolyte secondary battery. Examples of the negative-electrode active material include carbon materials, such as graphite and coke, tin oxide, metal lithium, metals capable of forming an alloy with lithium, such as silicon, and alloys of the metals.

The nonaqueous electrolytic solution used in the present invention is not particularly limited so long as it can be used for nonaqueous electrolyte secondary batteries. A general example of the nonaqueous electrolytic solution is one containing a supporting salt and a solvent.

Examples of the supporting salt include $LiBF_4$, $LiPF_6$, $LiN(SO_2CF_3)_2$, $LiN(SO_2C_2F_5)_2$, and $LiPF_{6-x}(C_nF_{2n+1})_x$ where $1<x<6$ and $n=1$ or 2. These materials can be used singly or in a mixture of two or more of them. The concentration of the supporting salt is not particularly limited but is preferably within the range from 0.8 to 1.5 mol/L.

Preferred solvents to be used are carbonate solvents, such as ethylene carbonate, propylene carbonate, γ-butylolactone, diethylene carbonate, ethyl methyl carbonate and dimethyl carbonate, and carbonate solvents of such kinds in which one or some of hydrogen atoms are substituted with fluorine atom or atoms. The solvent is preferably used in a combination of a cyclic carbonate and a chain carbonate.

DETAILED DESCRIPTION OF PREFERRED EXAMPLES

Hereinafter, the present invention will be described with reference to specific examples. However, the present invention is not limited by the following examples, and can be embodied in various other forms appropriately modified without changing the spirit of the invention.

Experiment 1

Example A1

Synthesis of Positive-Electrode Active Material

Lithium cobalt oxide was prepared in which 1.5% by mole of Mg and 1.5% by mole of Al were dissolved in solid solution and 0.05% by mole of Zr was contained. The lithium cobalt oxide was obtained by using $Li_2CO_3$, $CO_3O_4$, MgO, $Al_2O_3$ and $ZrO_2$ to subject them to a heat treatment at 850° C. for 24 hours in an air atmosphere.

One thousand grams of the lithium cobalt oxide was added to 3 L of pure water and stirred to prepare a suspension containing the lithium cobalt oxide dispersed therein. A solution in which 3.18 g of erbium nitrate pentahydrate was dissolved was added to the suspension. During the addition, the suspension was continuously stirred. While the solution in which erbium nitrate pentahydrate was dissolved was added to the suspension, 10% by mass of sodium hydroxide aqueous solution was also added to maintain the pH of the solution containing the lithium cobalt oxide at 9.

Next, the resultant mixture was suction filtered and then washed with water, and the resultant powder was dried at 120° C. Thus, a product was obtained in which erbium hydroxide was uniformly deposited on the surface of the lithium cobalt oxide (hereinafter, the product in which erbium hydroxide was deposited on the surface of the lithium cobalt oxide is also referred to as an Er-coated positive-electrode active material).

Note that during the addition, the solution in which erbium nitrate pentahydrate is dissolved is preferably added stepwise to the suspension rather than all at once. If the full amount of the solution is added at once, the hydroxide, when changed from the solution containing erbium nitrate dissolved therein, is deposited only on part of the positive-electrode active material, whereby erbium hydroxide cannot be uniformly deposited on the surface of the lithium cobalt oxide.

Figure 5:
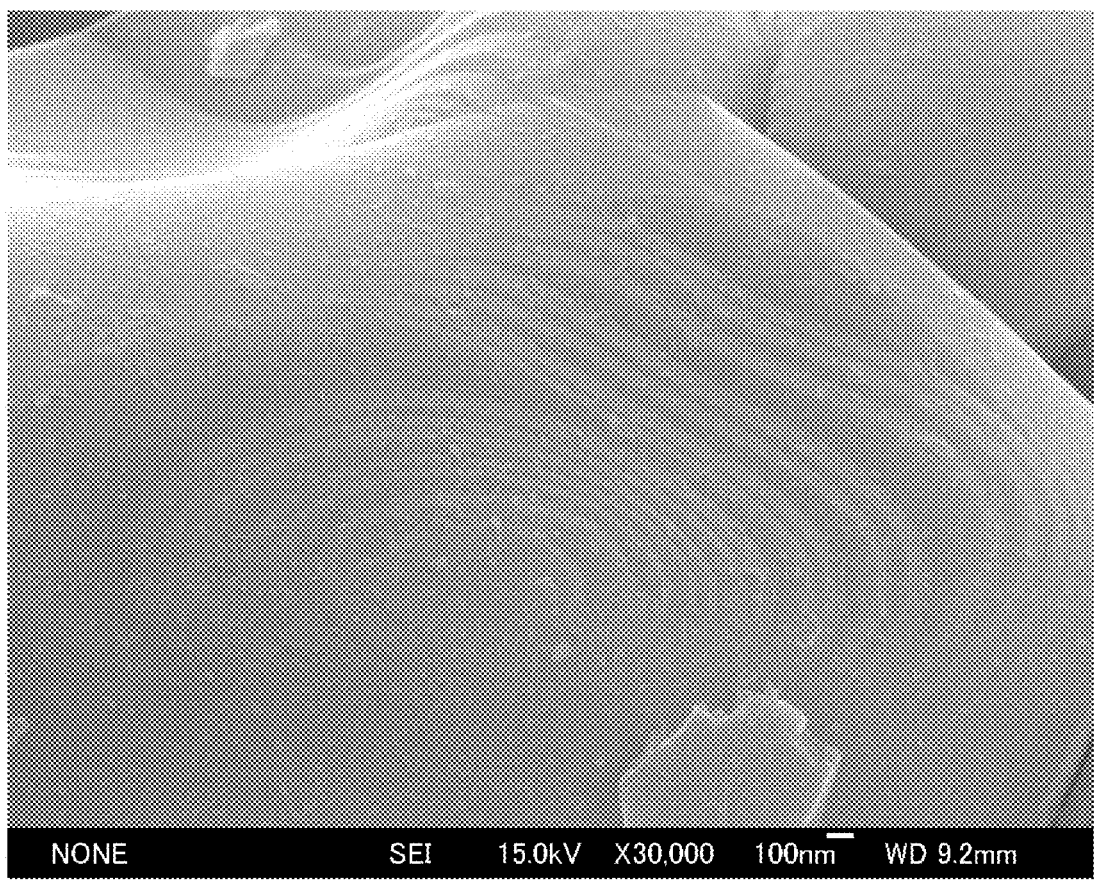
FIG. 5 is a scanning electron micrograph (×30000) showing the surface of a positive-electrode active material produced in Example A1.

The lithium cobalt oxide on which erbium hydroxide was deposited was subjected to a heat treatment at 300° C. for five hours in an air atmosphere. When the resultant positive-electrode active material was observed with a scanning electron microscopy (SEM), particles of an erbium compound having an average particle diameter of 100 nm or less were deposited in uniformly dispersed form on the surface of the positive-electrode active material as shown in FIG. 5. The amount of the erbium compound deposited was 0.12% by mass, in terms of erbium element, relative to the mass of the lithium cobalt oxide. Note that the amount of the erbium compound deposited was measured by ICP (Inductively Coupled Plasma) spectrometry.

[Production of Positive Electrode]

The positive-electrode active material obtained in the above manner, acetylene black as an electronic conductor, and N-methyl-2-pyrrolidinone in which poly(vinylidene fluoride) as a binder was dissolved were mixed, thereby preparing a slurry in which the positive-electrode active material, the electronic conductor and poly(vinylidene fluoride) were mixed to give a mass ratio of 95:2.5:2.5.

The slurry was applied on both surfaces of aluminum foil, dried and rolled to have a packing density of 3.60 g/cm$^3$, thereby producing a positive electrode.

[Production of Negative Electrode]

For the production of a negative electrode, a carbon material (graphite), CMC (carboxymethylcellulose sodium) and SBR (styrene butadiene rubber) were mixed in an aqueous solution to give a mass ratio of 98:1:1, thereby preparing a slurry.

The slurry was applied on both surfaces of copper foil, dried and rolled, thereby producing a negative electrode. Note that the packing density of the negative-electrode active material was 1.7 g/cm$^3$.

[Preparation of Nonaqueous Electrolytic Solution]

$LiPF_6$ was dissolved in a mixed solvent of ethylene carbonate (EC) and methylethyl carbonate (MEC) having a volume ratio EC:MEC of 3:7 to give a concentration of 1.0 mole per liter of the solvent. The resultant mixture was mixed with 1% by mass of vinylene carbonate and 1% by mass of adiponitrile as a nitrile compound, thereby preparing a nonaqueous electrolytic solution.

[Assembly of Battery]

Lead terminals were attached to the positive and negative electrodes produced in the above manners, and a separator was interposed between the positive and negative electrodes. Then, these components were helically winded up together and pressed down in a flattened form, thereby producing an electrode assembly.

Figure 1:
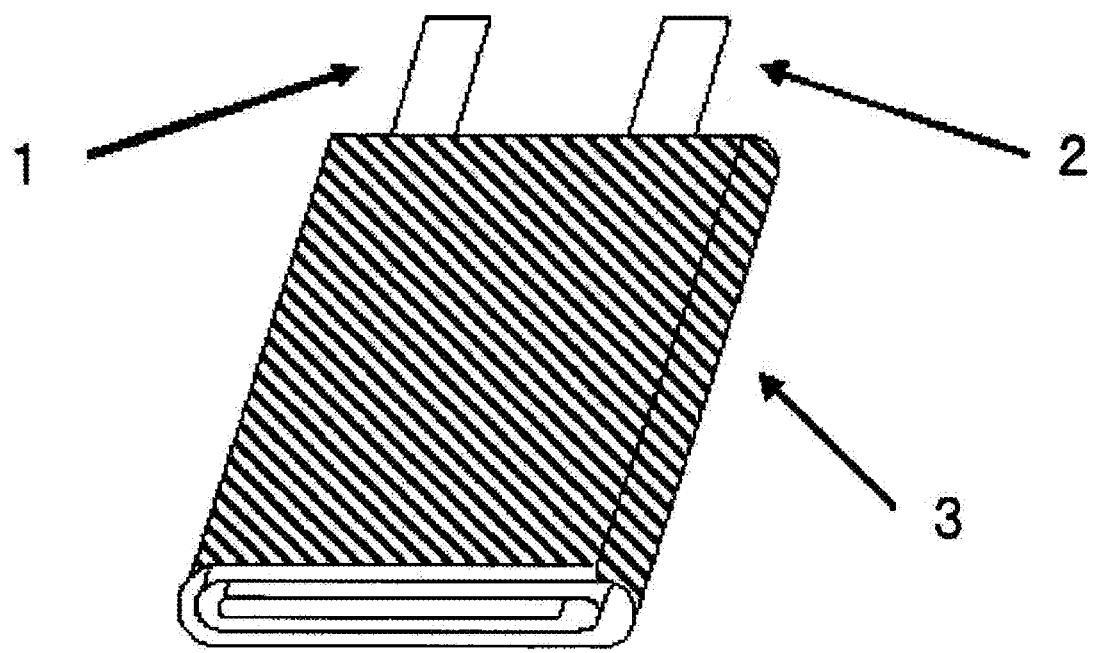
FIG. 1 is a perspective view showing an electrode assembly produced in Examples.

FIG. 1 is a perspective view showing the electrode assembly. As shown in FIG. 1, the positive electrode is provided with a positive electrode current collector tab 1 attached thereto, the negative electrode is provided with a negative electrode current collector tab 2 attached thereto, and these electrodes are helically winded up together to form an electrode assembly 3.

The electrode assembly was placed into a battery outer package made of an aluminum laminate, thereby producing a battery.

Figure 2:
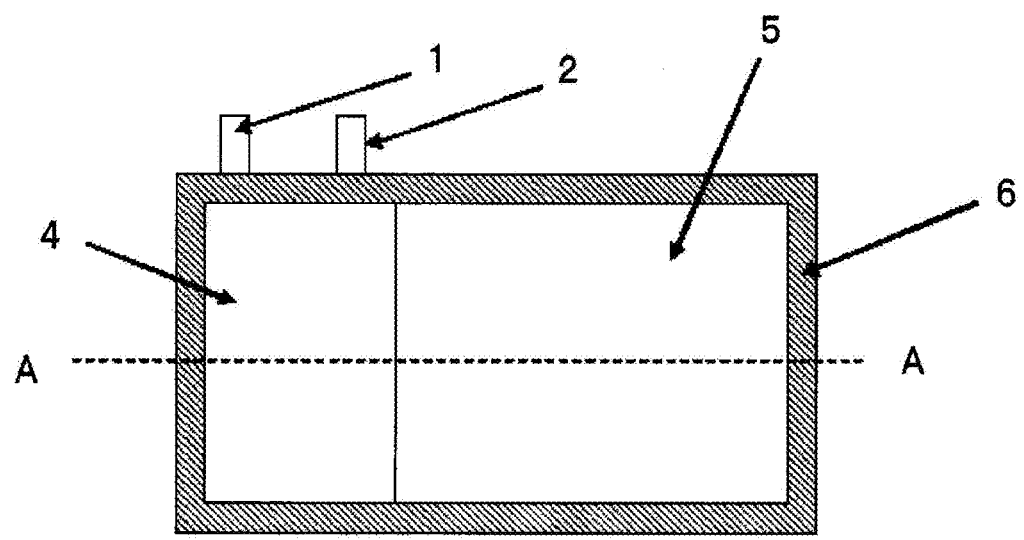
FIG. 2 is a plan view showing a lithium ion secondary battery produced in Examples.
Figure 3:
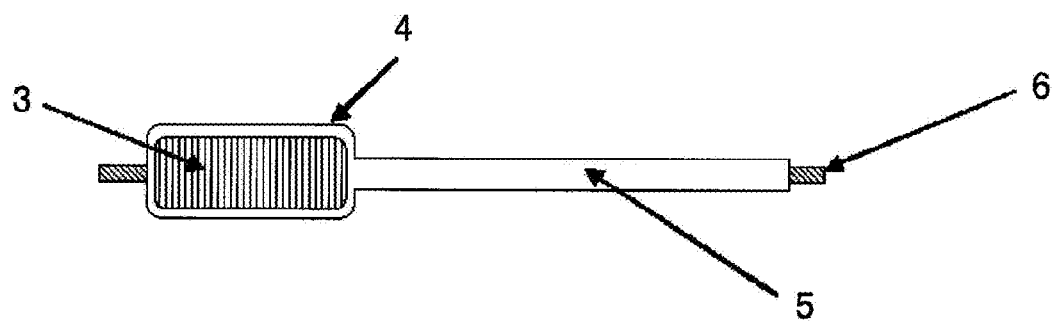
FIG. 3 is a cross-sectional view taking along the line A-A of FIG. 2.

FIG. 2 is a plan view showing the produced battery. FIG. 3 is a cross-sectional view taking along the line A-A of FIG. 2.

As shown in FIGS. 2 and 3, the outer package made of an aluminum laminate includes an electrode assembly section 4 in which the electrode assembly 3 is placed, and a spare room section 5 for storaging gas generated from the electrode assembly 3. The electrode assembly section 4 and the spare room section 5 are internally communicated with each other.

With three sides of the outer package heat-sealed at respective heat-sealing closure ends 6, the electrode assembly 3 was inserted into the electrode assembly section 4 of the outer package in a $CO_2$ atmosphere at 25° C. and 1 atmospheric pressure. Then, the remaining one side of the outer package was heat-sealed at the remaining heat-sealing closure end 6, whereby the outer package was fully sealed.

The size of the electrode assembly section 4 was 4 mm (thickness)×34 mm×54 mm. By sandwiching the electrode assembly section 4 between plates, a structural pressure was always applied to it. The size of the spare room section 5 was 54 mm×50 mm. As described above, gas generated in the electrode assembly section 4 moves to the spare room section 5. Therefore, even if gas is generated, the electrode assembly 3 can be prevented from being swelled by the gas and thereby increasing the resistance and deteriorating the charge and discharge characteristics.

Note that the design capacity of the produced battery was set at 750 mAh with reference to an end-of-charge voltage of 4.4 V.

In the way described above, the battery of Example A1 was produced.

Example A2

A positive-electrode active material was produced in the same manner as in Example A1 except that instead of erbium nitrate pentahydrate, 3.54 g of samarium nitrate hexahydrate was used. When the resultant positive-electrode active material was observed with a SEM, particles of a samarium compound having an average particle diameter of 100 nm or less were uniformly deposited on the surface of the positive-electrode active material, like the positive-electrode active material in Example A1. The amount of the samarium compound deposited was 0.12% by mass, in terms of samarium element, relative to the mass of the lithium cobalt oxide.

Using the above positive-electrode active material, a battery of Example A2 was produced in the same manner as in Example A1.

Example A3

A positive-electrode active material was produced in the same manner as in Example A1 except that instead of erbium nitrate pentahydrate, 3.65 g of neodymium nitrate hexahydrate was used. When the resultant positive-electrode active material was observed with a SEM, particles of a neodymium compound having an average particle diameter of 100 nm or less were uniformly deposited on the surface of the positive-electrode active material, like the positive-electrode active material in Example A1. The amount of the neodymium compound deposited was 0.12% by mass, in terms of neodymium element, relative to the mass of the lithium cobalt oxide.

Using the above positive-electrode active material, a battery of Example A3 was produced in the same manner as in Example A1.

Comparative Example a1

A battery of Comparative Example a1 was produced in the same manner as in Example A1 except that in Example A1 no adiponitrile was added to the nonaqueous electrolytic solution.

Comparative Example a2

In producing a positive-electrode active material in Example A1, erbium oxide was added to a source material for the lithium cobalt oxide, thereby producing lithium cobalt oxide in which 0.12% by mass of erbium was dissolved in solid solution. A battery of Comparative Example a2 was produced in the same manner as in Example A1 except that the obtained lithium cobalt oxide was used as a positive-electrode active material.

Comparative Example a3

A battery of Comparative Example a3 was produced in the same manner as in Example A1 except that the positive-electrode active material produced in Comparative Example a2 was used and no adiponitrile was added to the nonaqueous electrolytic solution.

Comparative Example a4

An amount of 1.37 g of erbium oxide was added to 1 kg of the lithium cobalt oxide obtained in the production of the positive-electrode active material in Example A1, followed by mixing in a mortar mixer, thereby obtaining lithium cobalt oxide in which erbium oxide was mixed. When the obtained positive-electrode active material was observed with a SEM, particles of erbium oxide had an average particle size of 400 nm or more and were localized on the surface of the lithium cobalt oxide. A battery of Comparative Example a4 was produced in the same manner as in Example A1 except that the above positive-electrode active material was used.

Comparative Example a5

A battery of Comparative Example a5 was produced in the same manner as in Example A1 except that the positive-electrode active material produced in Comparative Example a4 was used as a positive-electrode active material and no adiponitrile was added to the nonaqueous electrolytic solution.

Comparative Example a6

A positive-electrode active material was produced in the same manner as in Example A1 except that instead of erbium nitrate pentahydrate, 3.51 g of zirconium oxynitrate dihydrate was used. When the resultant positive-electrode active material was observed with a SEM, particles of a zirconium compound having an average particle diameter of 100 nm or less were uniformly deposited on the surface of the positive-electrode active material, like the positive-electrode active material in Example A1 (hereinafter, the product in which a zirconium compound was deposited on the surface of the lithium cobalt oxide is also referred to as a Zr-coated positive-electrode active material).

A battery of Comparative Example a6 was produced in the same manner as in Example A1 except that the above positive-electrode active material was used.

Comparative Example a7

A battery of Comparative Example a7 was produced in the same manner as in Example A1 except that the positive-electrode active material produced in Comparative Example a6 was used and no adiponitrile was added to the nonaqueous electrolytic solution.

Comparative Example a8

A battery of Comparative Example a8 was produced in the same manner as in Example A1 except that in the preparation of the electrolytic solution in Example A1, malononitrile was used instead of adiponitrile.

Comparative Example a9

A battery of Comparative Example a9 was produced in the same manner as in Example A1 except that the positive-electrode active material, produced in Comparative Example a6, on the surface of which the Zr compound was deposited was used and malononitrile was used instead of adiponitrile.

Comparative Example a10

A battery of Comparative Example a10 was produced in the same manner as in Example A2 except that in Example A2 no adiponitrile was added to the nonaqueous electrolytic solution.

Comparative Example a11

A battery of Comparative Example a11 was produced in the same manner as in Example A3 except that in Example A3 no adiponitrile was added to the nonaqueous electrolytic solution.

<Evaluation of Batteries>

In the measurement of initial charge/discharge capacity and 60° C. continuous charge test described below, each battery was subjected to a charge-discharge cycle test under the following charge and discharge conditions.

Charge: Each battery was charged to 4.4 V at a constant current of 1 It (750 mA) and then charged to a current of 37.5 mA at a constant voltage of 4.4 V.

Discharge: Each battery was discharged to 2.75 V at a constant current of 1 It (750 mA).

Pause: The pause interval between charging and discharging was set at 10 minutes.

[Measurement of Initial Discharge Capacity]

After the battery was subjected to a single charge-discharge cycle test under the above charge and discharge conditions, its initial discharge capacity ($Q_0$) was measured.

[60° C. Continuous Charge Test]

The battery was subjected to a single charge-discharge cycle test under the above charge and discharge conditions to confirm that the same initial discharge capacity ($Q_0$) as above was obtained. Then, the battery was allowed to stand for an hour in a constant temperature bath at 60° C. Thereafter, the battery was charged to 4.4 V at a constant current of 750 mA while being still placed in an environment at 60° C., and further charged at a constant voltage of 4.4 V. The total charging period of time was 80 hours.

After the continuous charging, the increase in battery thickness of the spare room section from that before the continuous charging was measured. Thereafter, the battery was cooled down to the room temperature, the first discharge capacity ($Q_1$) after the continuous charge test and the second discharge capacity ($Q_2$) after the continuous charge test were measured at the room temperature, and the remaining capacity rate and the recovery capacity rate were obtained from the following equations.

Remaining capacity rate (%)={(first discharge capacity ($Q_1$) after continuous charge test)/(discharge capacity ($Q_0$) before continuous charge test)}×100

Recovery capacity rate (%)={(second discharge capacity ($Q_2$) after continuous charge test)/(discharge capacity ($Q_0$) before continuous charge test)}×100

Figure 4:
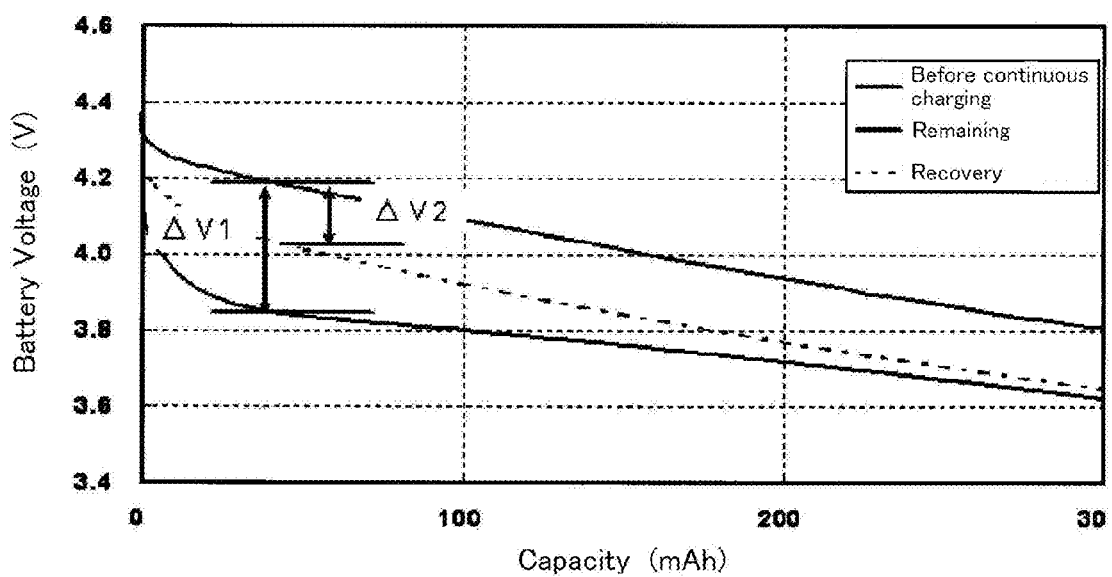
FIG. 4 is a graph for illustrating a method for measuring the maximum discharge voltage drop ΔV1 during measurement of the remaining capacity after continuous charging and a method for measuring the maximum discharge voltage drop ΔV2 during measurement of the recovery discharge capacity.

Furthermore, as shown in FIG. 4, a maximum discharge voltage drop ΔV1 was obtained from the initial discharge curve during measurement of the remaining capacity and the initial discharge curve during measurement of the initial discharge capacity, and a maximum discharge voltage drop ΔV2 was obtained from the initial discharge curve during measurement of the recovery capacity and the initial discharge curve during measurement of the initial discharge capacity. Note that in FIG. 4 the initial discharge curve during measurement of the initial discharge capacity is indicated by "Before continuous charging", the initial discharge curve during measurement of the remaining capacity is indicated by "Remaining", and the initial discharge curve during measurement of the recovery capacity is indicated by "Recovery".

TABLE 1 shows the results of the remaining capacity rates, recovery capacity rates, ΔV1, ΔV2 and thickness increases of the battery spare room sections of the above Examples and Comparative Examples

TABLE 1

| | Positive-Electrode Active Material | Nitrile Compound | | Remaining Capacity Rate (%) | Recovery Capacity Rate (%) | Thickness Increase (mm) | ΔV1 (Initial Voltage Drop during Remaining Discharge) (mV) | ΔV2 (Initial Voltage Drop during Recovery Discharge) (mV) |
|---|---|---|---|---|---|---|---|---|
| | | Type | Amount Added (%) | | | | | |
| Example A1 | Er-coated | Adiponitrile NCC$_4$H$_8$CN | 1 | 89.4 | 84.9 | 0.10 | 83 | 0 |
| Example A2 | Sm-coated | Adiponitrile NCC$_4$H$_8$CN | 1 | 88 | 84.5 | 0.13 | 90 | 0 |
| Example A3 | Nd-coated | Adiponitrile NCC$_4$H$_8$CN | 1 | 88.2 | 84.6 | 0.12 | 90 | 0 |
| Comparative Example a1 | Er-coated | — | 0 | 85.4 | 83.6 | 0.95 | 247 | 60 |
| Comparative Example a2 | Er-dissolved in solid solution | Adiponitrile NCC$_4$H$_8$CN | 1 | 82.4 | 76.8 | 0.56 | 432 | 252 |
| Comparative Example a3 | Er-dissolved in solid solution | — | 0 | 69.6 | 65.9 | 3.64 | 369 | 204 |

TABLE 1-continued

| | Positive-Electrode Active Material | Nitrile Compound Type | Nitrile Compound Amount Added (%) | Remaining Capacity Rate (%) | Recovery Capacity Rate (%) | Thickness Increase (mm) | ΔV1 (Initial Voltage Drop during Remaining Discharge) (mV) | ΔV2 (Initial Voltage Drop during Recovery Discharge) (mV) |
|---|---|---|---|---|---|---|---|---|
| Comparative Example a4 | Er-added | Adiponitrile $NCC_4H_8CN$ | 1 | 76.4 | 66.5 | 1.47 | 675 | 562 |
| Comparative Example a5 | Er-added | — | 0 | 55.5 | 55.7 | 4.49 | 552 | 427 |
| Comparative Example a6 | Zr-coated | Adiponitrile $NCC_4H_8CN$ | 1 | 86.4 | 81.3 | 0.36 | 351 | 90 |
| Comparative Example a7 | Zr-coated | — | 0 | 78.5 | 78.6 | 2.12 | 230 | 106 |
| Comparative Example a8 | Er-coated | Malononitrile $NCCH_2CN$ | 1 | 70.2 | 65.2 | 0.48 | 249 | 120 |
| Comparative Example a9 | Zr-coated | Malononitrile $NCCH_2CN$ | 1 | 46.2 | 42 | 3.27 | 562 | 460 |
| Comparative Example a10 | Sm-coated | — | 0 | 82.2 | 83.1 | 0.96 | 251 | 70 |
| Comparative Example a11 | Nd-coated | — | 0 | 82.1 | 82.9 | 0.99 | 260 | 70 |

As shown in TABLE 1, the batteries of Examples A1 to A3 according to the present invention exhibit higher remaining capacity rates and higher recovery capacity rates than those of Comparative Examples a1 to a11. Furthermore, the batteries of Examples A1 to A3 according to the present invention significantly reduce the voltage drop ΔV1 in the initial stage of remaining discharge and the voltage drop ΔV2 in the initial stage of recovery discharge as compared to the batteries of Comparative Examples a1 to a11.

Since the batteries of Comparative Examples a1, a10 and a11 contain no nitrile compound added thereto, the voltage drop ΔV1 in the initial stage of remaining discharge is large. It can be assumed that the reason for this is that since no nitrile compound is added to the batteries, the decomposition of the electrolytic solution could not be sufficiently inhibited and a film was formed during high-temperature continuous charging.

In Comparative Examples a2 and a3, erbium is not deposited on the surface of the positive-electrode active material but dissolved in solid solution in the interior thereof. In Comparative Example a3 to which no nitrile compound is added, the decomposition reaction of the electrolytic solution is significant, so that a thick film of a decomposed material of the electrolytic solution is formed. This increases ΔV1 and lowers the remaining capacity itself. On the other hand, in Comparative Example a2 to which a nitrile compound is added, the decomposition reaction of the electrolytic solution is inhibited by a coating of the nitrile compound formed during initial charging and discharging, whereby gas generation and decrease in remaining capacity are inhibited. However, ΔV1 is very large.

In Comparative Examples a4 and a5, an erbium compound is not deposited in uniformly dispersed form on the surface of the positive-electrode active material unlike Example A1, but localized on part of the surface of the positive-electrode active material. In Comparative Example a5 to which no nitrile compound is added, the decomposition reaction of the electrolytic solution is significant, so that a thick film of a decomposed material of the electrolytic solution is formed. This increases ΔV1 and lowers the remaining capacity itself. On the other hand, in Comparative Example a4 to which a nitrile compound is added, the decomposition reaction of the electrolytic solution is inhibited by a coating of the nitrile compound formed during initial charging and discharging, whereby gas generation and decrease in remaining capacity are inhibited. However, ΔV1 is very large.

In Comparative Examples a6 and a7, a Zr compound is deposited in dispersed form on the surface of the positive-electrode active material. However, the Zr compound is less effective in inhibiting the decomposition reaction of the electrolytic solution, so that gas is generated and a film of a decomposed material of the electrolytic solution is formed. Therefore, ΔV1 is large. In Comparative Example a6 to which a nitrile compound is added, a coating of the nitrile compound is formed during initial charging and discharging. However, even if the Zr compound is deposited on the surface of the positive-electrode active material, there is no effect of inhibiting further decomposition of the electrolytic solution as in gaps in the coating formed by the decomposition of the nitrile compound. Therefore, during the subsequent charging and discharging, a new film is formed from a decomposed material of the electrolytic solution. For this reason, during measurement of the remaining capacity, the resistance increases and ΔV1 becomes larger than that in Comparative Example a7 to which no nitrile compound is added.

In Comparative Examples a8 and a9, malononitrile, which is a nitrile compound whose number of carbon atoms is three, is used as a nitrile compound. In this case, even if erbium is deposited in dispersed form on the surface of the positive-electrode active material, the remaining capacity significantly decreases and ΔV1 also significantly decreases.

[Observation with Scanning Electron Microscope (SEM)]

Figure 6:
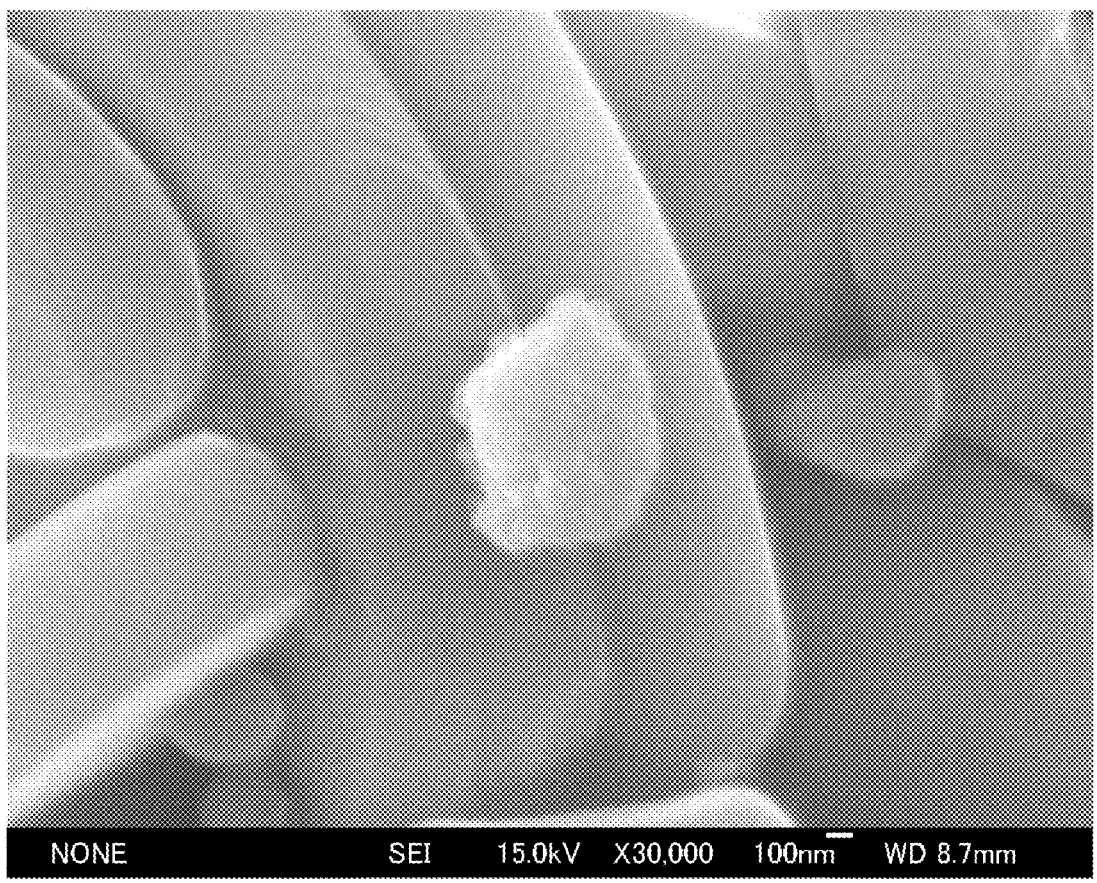
FIG. 6 is a scanning electron micrograph (×30000) showing the surface of a positive-electrode active material produced in Comparative Example a4.
Figure 7:
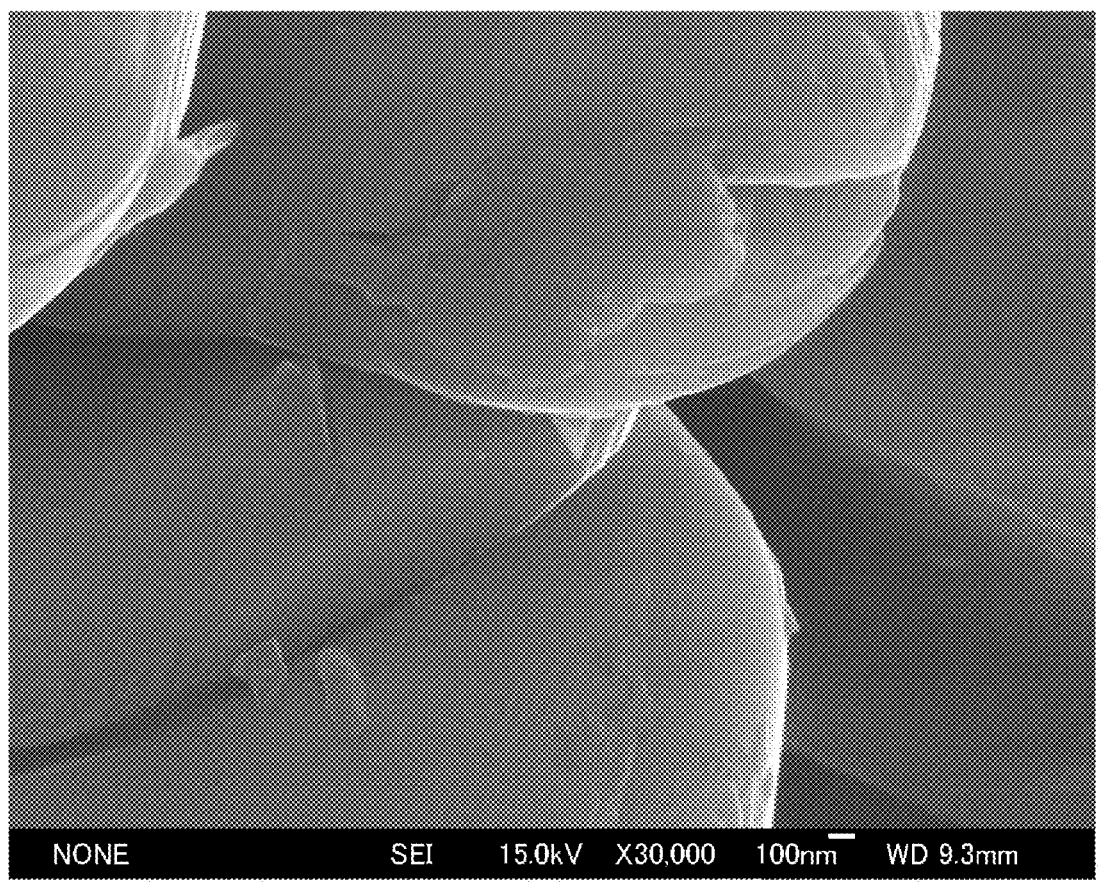
FIG. 7 is a scanning electron micrograph (×30000) showing the surface of a positive-electrode active material on which no rare-earth element compound is deposited.

FIG. 5 is a scanning electron micrograph showing the surface of the positive-electrode active material produced in Example A1. FIG. 6 is a scanning electron micrograph showing the surface of the positive-electrode active material produced in Comparative Example a4. FIG. 7 is a scanning electron micrograph showing the surface of the lithium cobalt oxide before erbium hydroxide is deposited thereon.

FIG. 5 shows that in the positive-electrode active material of Example A1, particles having an average particle diameter of 100 nm or less are deposited in uniformly dispersed form on the surface.

FIG. 6 shows that in the positive-electrode active material of Comparative Example a4 to which erbium oxide is added and mixed, no particles are deposited on the surface. A particle located in the center of FIG. 6 is an erbium oxide particle having a particle diameter of 300 to 400 nm.

As shown in FIG. 7, such particles as shown in FIG. 5 are not observed on the surface of the positive-electrode active material on which no rare earth element compound has been deposited.

Experiment 2

In this experiment, examination was made by changing the type of nitrile compound.

Example B1

A battery of Example B1 was produced in the same manner as in Example A1 except that instead of adiponitrile, 1% by mass of succinonitrile was added to the nonaqueous electrolytic solution.

Example B2

A battery of Example B2 was produced in the same manner as in Example A1 except that instead of adiponitrile, 1% by mass of glutaronitrile was added to the nonaqueous electrolytic solution.

Example B3

A battery of Example B3 was produced in the same manner as in Example A1 except that instead of adiponitrile, 1% by mass of pimelonitrile was added to the nonaqueous electrolytic solution.

Example B4

A battery of Example B4 was produced in the same manner as in Example A1 except that instead of adiponitrile, 1% by mass of 1,2,3-propanetricarbonitrile was added to the nonaqueous electrolytic solution.

Example B5

A battery of Example B5 was produced in the same manner as in Example A1 except that instead of adiponitrile, 1% by mass of 1,3,5-pentanetricarbonitrile was added to the nonaqueous electrolytic solution.

Example B6

A battery of Example B6 was produced in the same manner as in Example A1 except that instead of adiponitrile, 1% by mass of butyronitrile was added to the nonaqueous electrolytic solution.

Example B7

A battery of Example B7 was produced in the same manner as in Example A1 except that instead of adiponitrile, 1% by mass of valeronitrile was added to the nonaqueous electrolytic solution.

Example B8

A battery of Example B8 was produced in the same manner as in Example A1 except that instead of adiponitrile, 1% by mass of n-heptanenitrile was added to the nonaqueous electrolytic solution.

Comparative Example b1

A battery of Comparative Example b1 was produced in the same manner as in Comparative Example a6 except that instead of adiponitrile, 1% by mass of succinonitrile was added to the nonaqueous electrolytic solution.

Comparative Example b2

A battery of Comparative Example b2 was produced in the same manner as in Comparative Example a6 except that instead of adiponitrile, 1% by mass of glutaronitrile was added to the nonaqueous electrolytic solution.

Comparative Example b3

A battery of Comparative Example b3 was produced in the same manner as in Comparative Example a6 except that instead of adiponitrile, 1% by mass of pimelonitrile was added to the nonaqueous electrolytic solution.

Comparative Example b4

A battery of Comparative Example b4 was produced in the same manner as in Comparative Example a6 except that instead of adiponitrile, 1% by mass of 1,2,3-propanetricarbonitrile was added to the nonaqueous electrolytic solution.

Comparative Example b5

A battery of Comparative Example b5 was produced in the same manner as in Comparative Example a6 except that instead of adiponitrile, 1% by mass of 1,3,5-pentanetricarbonitrile was added to the nonaqueous electrolytic solution.

Comparative Example b6

A battery of Comparative Example b6 was produced in the same manner as in Comparative Example a6 except that instead of adiponitrile, 1% by mass of butyronitrile was added to the nonaqueous electrolytic solution.

Comparative Example b7

A battery of Comparative Example b7 was produced in the same manner as in Comparative Example a6 except that instead of adiponitrile, 1% by mass of valeronitrile was added to the nonaqueous electrolytic solution.

Comparative Example b8

A battery of Comparative Example b8 was produced in the same manner as in Comparative Example a6 except that instead of adiponitrile, 1% by mass of n-heptanenitrile was added to the nonaqueous electrolytic solution.

Comparative Example b9

A battery of Comparative Example b9 was produced in the same manner as in Example A1 except that instead of adiponitrile, 1% by mass of acetonitrile was added to the nonaqueous electrolytic solution.

Comparative Example b10

A battery of Comparative Example b10 was produced in the same manner as in Comparative Example a6 except that instead of adiponitrile, 1% by mass of acetonitrile was added to the nonaqueous electrolytic solution.

Comparative Example b11

A battery of Comparative Example b11 was produced in the same manner as in Example A1 except that instead of adiponitrile, 1% by mass of propionitrile was added to the nonaqueous electrolytic solution.

Comparative Example b12

A battery of Comparative Example b12 was produced in the same manner as in Comparative Example a6 except that instead of adiponitrile, 1% by mass of propionitrile was added to the nonaqueous electrolytic solution.

[Evaluation of Batteries]

In the same manner as in Experiment 1, the obtained batteries of the above Examples and Comparative Examples were evaluated. The evaluation results are shown in TABLES 2 and 3.

TABLE 2

| | Positive-Electrode Active Material | Nitrile Compound Type | Amount Added (%) | Remaining Capacity Rate (%) | Recovery Capacity Rate (%) | Thickness Increase (mm) | $\Delta V1$ (Initial Voltage Drop during Remaining Discharge) (mV) | $\Delta V2$ (Initial Voltage Drop during Recovery Discharge) (mV) |
|---|---|---|---|---|---|---|---|---|
| Example A1 | Er-coated | Adiponitrile $NCC_4H_8CN$ | 1 | 89.4 | 84.9 | 0.1 | 83 | 0 |
| Example B1 | Er-coated | Succinonitrile $NCC_2H_4CN$ | 1 | 90.2 | 86 | 0.1 | 170 | 0 |
| Comparative Example b1 | Zr-coated | Succinonitrile $NCC_2H_4CN$ | 1 | 85.7 | 81.1 | 0.72 | 350 | 138 |
| Example B2 | Er-coated | Glutaronitrile $NCC_3H_6CN$ | 1 | 93.2 | 88.5 | 0.1 | 95 | 0 |
| Comparative Example b2 | Zr-coated | Glutaronitrile $NCC_3H_6CN$ | 1 | 85.6 | 81.9 | 0.08 | 293 | 97 |
| Example B3 | Er-coated | Pimelonitrile $NCC_5H_{10}CN$ | 1 | 93.1 | 87.2 | 0.27 | 95 | 0 |
| Comparative Example b3 | Zr-coated | Pimelonitrile $NCC_5H_{10}CN$ | 1 | 88.5 | 86.8 | 0.12 | 232 | 38 |
| Example B4 | Er-coated | 1,2,3-Propanetri-carbonitrile $NCCH_2CHCNCH_2CN$ | 1 | 91.9 | 86.8 | 0.01 | 83 | 0 |
| Comparative Example b4 | Zr-coated | 1,2,3-Propanetri-carbonitrile $NCCH_2CHCNCH_2CN$ | 1 | 88.4 | 83.7 | 0.06 | 230 | 65 |
| Example B5 | Er-coated | 1,3,5-Pentanetri-carbonitrile $NCC_2H_4CHCNC_2H_4CN$ | 1 | 92.4 | 86.7 | 0.12 | 84 | 0 |
| Comparative Example b5 | Zr-coated | 1,3,5-Pentanetri-carbonitrile $NCC_2H_4CHCNC_2H_4CN$ | 1 | 88.9 | 86.4 | 0.18 | 220 | 30 |

TABLE 3

| | Positive-Electrode Active Material | Nitrile Compound Type | Amount Added (%) | Remaining Capacity Rate (%) | Recovery Capacity Rate (%) | Thickness Increase (mm) | $\Delta V1$ (Initial Voltage Drop during Remaining Discharge) (mV) | $\Delta V2$ (Initial Voltage Drop during Recovery Discharge) (mV) |
|---|---|---|---|---|---|---|---|---|
| Example B6 | Er-coated | Butyronitrile $C_3H_7CN$ | 1 | 87.9 | 82.3 | 0.3 | 193 | 30 |
| Comparative Example b6 | Zr-coated | Butyronitrile $C_3H_7CN$ | 1 | 77.8 | 73.7 | 1.91 | 334 | 27 |
| Example B7 | Er-coated | Valeronitrile $C_4H_9CN$ | 1 | 89 | 84.7 | 0.44 | 193 | 24 |
| Comparative Example b7 | Zr-coated | Valeronitrile $C_4H_9CN$ | 1 | 80.3 | 75.3 | 0.45 | 330 | 29 |
| Example B8 | Er-coated | n-Heptanenitrile $C_6H_{13}CN$ | 1 | 89.6 | 84.3 | 0.26 | 174 | 25 |

TABLE 3-continued

| | Positive-Electrode Active Material | Nitrile Compound Type | Amount Added (%) | Remaining Capacity Rate (%) | Recovery Capacity Rate (%) | Thickness Increase (mm) | ΔV1 (Initial Voltage Drop during Remaining Discharge) (mV) | ΔV2 (Initial Voltage Drop during Recovery Discharge) (mV) |
|---|---|---|---|---|---|---|---|---|
| Comparative Example b8 | Zr-coated | n-Heptanenitrile $C_6H_{13}CN$ | 1 | 83.4 | 77.3 | 0.26 | 330 | 29 |
| Comparative Example b9 | Er-coated | Acetonitrile $CH_3CN$ | 1 | 53.7 | 51.3 | 4.65 | 746 | 53 |
| Comparative Example b10 | Zr-coated | Acetonitrile $CH_3CN$ | 1 | 51 | 43.1 | 5.72 | 823 | 50 |
| Comparative Example b11 | Er-coated | Propionitrile $C_2H_5CN$ | 1 | 76.2 | 72.7 | 2.25 | 422 | 42 |
| Comparative Example b12 | Zr-coated | Propionitrile $C_2H_5CN$ | 1 | 61.6 | 56.2 | 2.08 | 586 | 50 |

It can be seen from TABLES 2 and 3 that also if the nitrile compound added to the electrolytic solution is succinonitrile, glutaronitrile, pimelonitrile, 1,2,3-propanetricarbonitrile, 1,3,5-pentanetricarbonitrile, butyronitrile, valeronitrile or n-heptanenitrile, the batteries using an Er-coated positive-electrode active material (Examples B1 to B8) increase the remaining capacity and recovery capacity after high-temperature continuous charging and significantly reduce the discharge voltage drop ΔV1 during measurement of the remaining capacity and the discharge voltage drop ΔV2 during measurement of the recovery capacity, as compared to the batteries using a Zr-coated positive-electrode active material (Comparative Examples b1 to b8).

A comparison of Examples A1 and B1 to B5 with Examples B6 to B8 indicates that the addition of a nitrile compound having two or more nitrile groups to the electrolytic solution more significantly reduces the discharge voltage drop ΔV1 during measurement of the remaining capacity and the discharge voltage drop ΔV2 during measurement of the recovery capacity.

A comparison of Examples A1 and B1 to B3 with Examples B4 and B5 indicates that the addition of a nitrile compound having three or more nitrile groups to the electrolytic solution is more effective in reducing the discharge voltage drop ΔV1 during measurement of the remaining capacity.

A comparison of Example B1 with Examples A1 and B2 to B5 indicates that in nitrile compounds having two or more nitrile groups, those having five or more carbon atoms, i.e., those having three or more carbons in each chain saturated hydrocarbon group, are particularly highly effective in reducing ΔV1.

Furthermore, as seen from Comparative Examples b9 to b12, if a nitrile compound is added to the electrolytic solution but the number of carbon atoms in the nitrile compound is three or less, even batteries using an Er-coated positive-electrode active material do not provide much improvement in all of the remaining capacity rate, the recovery capacity rate, the discharge voltage drop ΔV1 during measurement of the remaining capacity and the discharge voltage drop ΔV2 during measurement of the recovery capacity, as compared to the batteries using a Zr-coated positive-electrode active material.

Experiment 3

In this experiment, examination was made of methods for depositing a rare earth compound.

Example C1

While 1000 g of the same lithium cobalt oxide powder as used in Example A1 was stirred with a mixer "T. K. HIVIS MIX" manufactured by PRIMIX Corporation, a solution of 2.98 g of erbium acetate tetrahydrate in 150 mL of pure water was sprayed on the lithium cobalt oxide powder. Thereby, the surface of the lithium cobalt oxide powder was moistened with the erbium salt solution. Note that the powder and liquid were not separated but the entire lithium cobalt oxide powder was moistened.

The powder was dried at 120° C. Thus, a product was obtained in which erbium hydroxide was uniformly deposited on the surface of the lithium cobalt oxide. The lithium cobalt oxide on which erbium hydroxide was deposited was subjected to a heat treatment at 300° C. for five hours in an air atmosphere. Thus, a positive-electrode active material on the surface of which an erbium oxyhydroxide compound was deposited was obtained. The amount of the erbium compound deposited was 0.12% by mass, in terms of erbium element, relative to the mass of the lithium cobalt oxide. Note that the amount of the erbium compound deposited was measured by ICP spectrometry.

Figure 8:
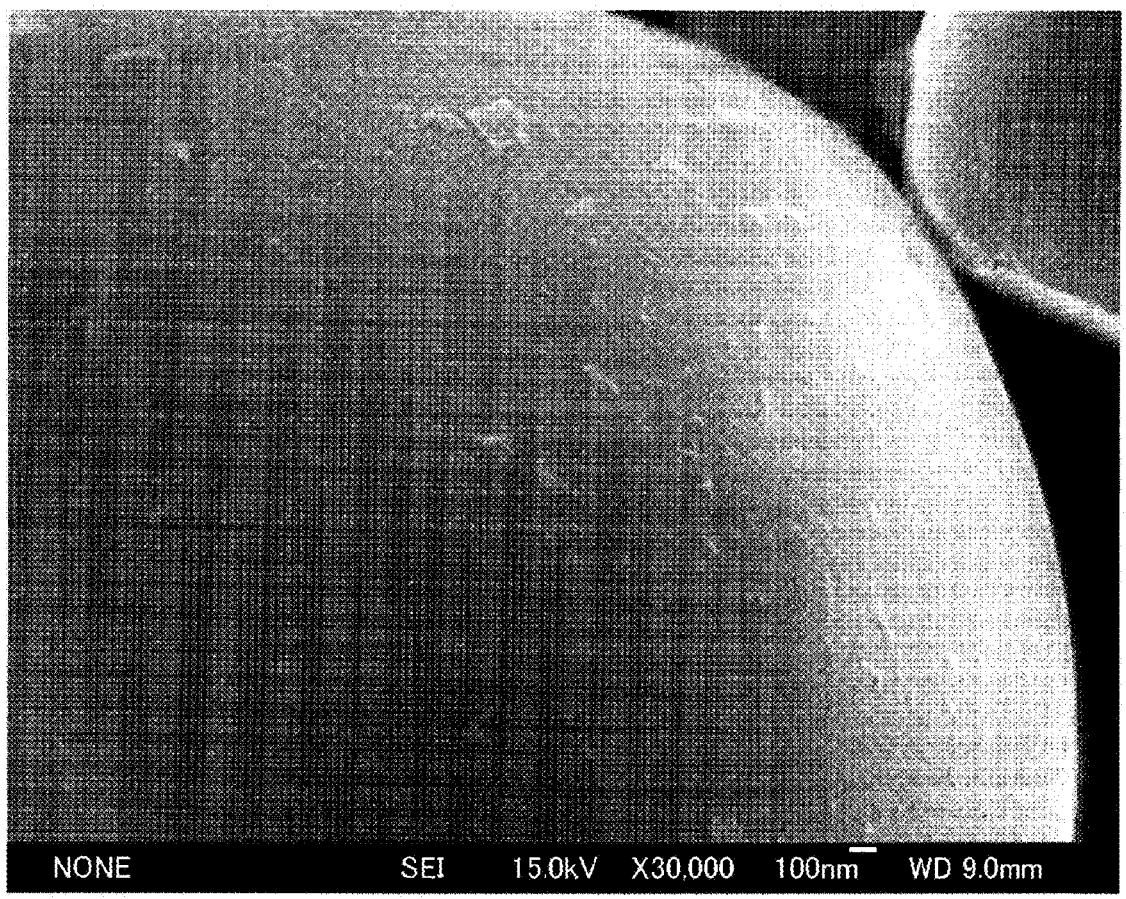
FIG. 8 is a scanning electron micrograph (×30000) showing the surface of a positive-electrode active material produced in Example C1.

When the resultant positive-electrode active material was observed with a scanning electron microscopy (SEM), particles of an erbium compound having an average particle diameter of 100 nm or less were deposited in uniformly dispersed form on the surface of the positive-electrode active material as shown in FIG. 8.

Using the obtained positive-electrode active material, a battery of Example C1 was produced in the same manner as in Example A1. Note that the electrolytic solution used was an electrolytic solution to which 1% by mass of adiponitrile was added like Example A1.

Comparative Example c1

A battery of Comparative Example c1 was obtained in the same manner as in Example C1 except that in Example C1, an electrolytic solution to which no adiponitrile was added was used.

Using the batteries of Example C1 and Comparative Example c1, the same test as for the battery of Example A1 was performed. The evaluation results are shown in TABLE 4.

TABLE 4

| | Positive-Electrode | Nitrile Compound | | Remaining Capacity | Recovery Capacity | Thickness | ΔV1 (Initial Voltage Drop during | ΔV2 (Initial Voltage Drop during |
|---|---|---|---|---|---|---|---|---|
| | Active Material | Type | Amount Added (%) | Rate (%) | Rate (%) | Increase (mm) | Remaining Discharge) (mV) | Recovery Discharge) (mV) |
| Example A1 | Er-coated | Adiponitrile NCC$_4$H$_8$CN | 1 | 89.4 | 84.9 | 0.1 | 83 | 0 |
| Example C1 | Er-coated | Adiponitrile NCC$_4$H$_8$CN | 1 | 89.2 | 84.5 | 0.22 | 90 | 0 |
| Comparative Example c1 | Er-coated | — | 0 | 84.6 | 83.3 | 1.25 | 262 | 78 |

As shown in TABLE 4, the battery of Example C1 increases the remaining capacity and recovery capacity after high-temperature continuous charging and significantly reduces the battery thickness increase, the discharge voltage drop ΔV1 during measurement of the remaining capacity and the discharge voltage drop ΔV2 during measurement of the recovery capacity, as compared to the battery of Comparative Example c1.

Now comparing the SEM photograph of FIG. 8 with the SEM photograph of FIG. 5 corresponding to the surface of the positive-electrode active material of Example A1, there exist a large number of 10 to 30 nm diameter particles in the latter, while there exist a large number of 50 nm or more diameter particles in the former. It can be assumed that in the method of Example C1, the rare earth salt solution and the positive-electrode active material directly react at the surface of the positive-electrode active material, whereby particles of the erbium compound deposited on the surface of the positive-electrode active material of Example C1 have larger diameters than those in Example A1. Referring to TABLE 4, the battery of Example C1 is slightly poorer in remaining capacity and recovery capacity after high-temperature continuous charging, battery thickness increase and discharge voltage drop ΔV1 during measurement of the remaining capacity than the battery of Example A1. It can be assumed that this is due to a difference in particle size between the erbium compounds.

Experiment 4

In this experiment, evaluation is made of the battery characteristics of cylindrical batteries.

Example D1

A positive electrode for an 18650 size cylindrical battery was produced by the same manufacturing method as in Example A1. Note that the packing density of the electrode was 3.9 g/cm$^3$. A negative electrode was also produced by the same manufacturing method as in Example A1. Note that the packing density of the negative electrode was 1.68 g/cm$^3$.

A separator was interposed between the obtained positive and negative electrodes, and these components were helically winded up together to produce an electrode assembly. The electrode assembly was inserted into a cylindrical battery casing, and an electrolytic solution was poured into the battery casing. The electrolytic solution was prepared as follows: First, EC and MEC were mixed to have a volume ratio of 3:7. Then added to the mixture was LiPF$_6$ to give a concentration of 1 mole per liter of the mixture. Added to the resultant mixture were 2% by mass of vinylene carbonate and 1% by mass of adiponitrile as a nitrile compound. The capacity of the battery was 2500 mAh, and the capacity ratio between the positive and negative electrodes was 1.05.

Comparative Example d1

A cylindrical battery was produced in the same manner as in Example D1 except that the positive-electrode active material of Comparative Example a6 was used.

[Evaluation of Battery Characteristics]

The batteries of Example D1 and Comparative Example d1 were evaluated for battery characteristics in the following manner.

Each battery was charged to 4.35 V at a constant current of 1250 mA at the room temperature and then charged to a current value of 50 mA at a constant voltage of 4.35 V. Next, the battery was discharged to 2.75 V at 2500 mA at the room temperature, thereby completing one charge and discharge cycle. This charge and discharge cycle was carried out three times.

After the measurement of the third discharge capacity, each battery was charged again to 4.35 V at a constant current of 1250 mA at the room temperature and then charged to a current value of 50 mA at a constant voltage of 4.35 V.

Next, the battery was stored at 60° C. for 20 days. After cooled down to the room temperature, the battery was discharged to a cutoff voltage of 2.75 V at 2500 mA. The discharge curves in this case are shown in FIG. 9.

Figure 9:
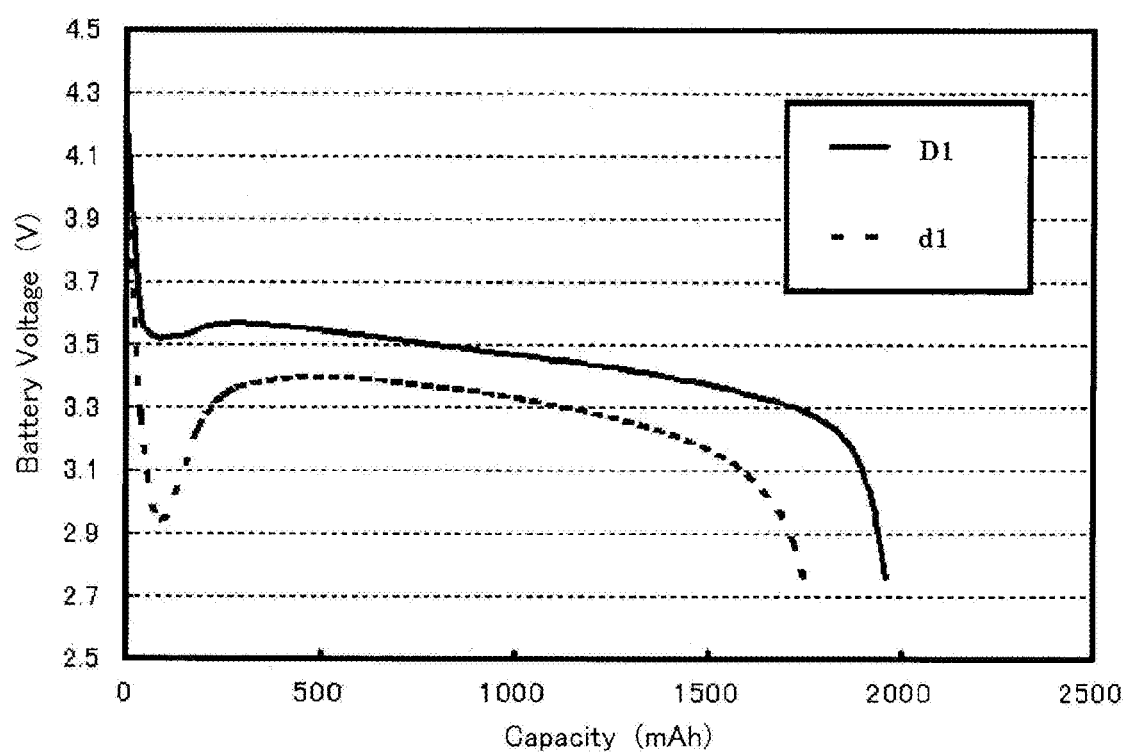
FIG. 9 is a graph showing discharge curves after storage in Example D1 and Comparative Example d1.

As shown in FIG. 9, Comparative Example d1 exhibiting a large ΔV1 in the test of Experiment 1 sharply drops the voltage to around 2.9 V in the initial stage of discharge. On the other hand, Example D1 exhibiting a small ΔV1 in the test of Experiment 1 drops the voltage only to about 3.5 V even in the initial stage of discharge.

Note that the cutoff voltage of the battery is not limited to 2.75 V and the battery may be designed to have a cutoff voltage of 3V, for example. If the cutoff voltage is set at 3 V, the battery of Comparative Example d1 has a remaining capacity of only less than 10% of the discharge capacity before the battery storage. Therefore, it will be appreciated that it is important to minimize ΔV1 and ΔV2 in Experiments 1, 2 and 3.

What is claimed is:
1. A nonaqueous electrolyte secondary battery including a positive electrode, a negative electrode and a nonaqueous electrolytic solution, wherein
the nonaqueous electrolytic solution contains a nitrile compound having a chain saturated hydrocarbon group and a nitrile group,
the number of carbon atoms in the nitrile compound is four or more, the positive electrode contains a positive-electrode active material on the surface of which particles of a rare earth compound are uniformly dispersed deposits;

wherein the rare earth compound consists essentially of a hydroxide or a oxyhydroxide of at least one element selected from the group consisting of erbium, samarium, neodymium, dysprosium, holmium, and thulium, and wherein the positive-electrode active material is at least one selected from the group consisting of lithium cobalt oxide, Ni—Co—Mn-containing lithium composite oxide, Ni—Mn—Al-containing lithium composite oxide and Ni—Co—Al-containing lithium composite oxide.

2. The nonaqueous electrolyte secondary battery according to claim 1, wherein the particles of the rare earth compound have an average particle diameter of 100 nm or less.

3. The nonaqueous electrolyte secondary battery according to claim 1, wherein the nitrile compound has two or more nitrile groups.

4. The nonaqueous electrolyte secondary battery according to claim 3, wherein the nitrile compound is at least one selected from glutaronitrile, adiponitrile and pimelonitrile.

5. The nonaqueous electrolyte secondary battery according to claim 1, wherein the nitrile compound has three or more nitrile groups.

6. The nonaqueous electrolyte secondary battery according to claim 5, wherein the nitrile compound is at least one selected from 1,2,3-propanetricarbonitrile and 1,3,5-pentanetricarbonitrile.

7. The nonaqueous electrolyte secondary battery according to claim 1, wherein an amount of the rare earth compound deposited on the positive-electrode active material is within the range from 0.005% to 0.3% by mass.

8. The nonaqueous electrolyte secondary battery according to claim 1, wherein the rare earth compound is selected from the group consisting of erbium, samarium, and neodymium.

9. The nonaqueous electrolyte secondary battery according to claim 1, wherein the rare earth compound is erbium.

10. A nonaqueous electrolyte secondary battery including a positive electrode, a negative electrode and a nonaqueous electrolytic solution, wherein the nonaqueous electrolytic solution contains a nitrile compound having a chain saturated hydrocarbon group and a nitrile group, the number of carbon atoms in the nitrile compound is four or more, and the positive electrode contains a positive-electrode active material comprising a lithium-containing transition metal composite oxide on the surface of which particles of a rare earth compound are uniformly dispersed deposits, wherein the rare earth compound comprises a hydroxide or an oxyhydroxide of at least one element selected from the group consisting of erbium, samarium, neodymium, ytterbium, terbium, dysprosium, holmium, thulium and lutetium, and the lithium-containing transition metal composite oxide is only one type selected from lithium cobalt oxide, Ni—Co—Mn-containing lithium composite oxide, Ni—Mn—Al-containing lithium composite oxide and Ni—Co—Al-containing lithium composite oxide.

11. The nonaqueous electrolyte secondary battery according to claim 10, wherein the lithium-containing transition metal composite oxide is only one type selected from lithium cobalt oxide, Ni—Co—Mn-containing lithium composite oxide, and Ni—Co—Al-containing lithium composite oxide.

12. The nonaqueous electrolyte secondary battery according to claim 11, wherein only the particles of the rare earth compound are uniformly dispersed deposits on the lithium-containing transition metal composite oxide.

* * * * *